(12) United States Patent
Buckingham

(10) Patent No.: US 6,833,970 B2
(45) Date of Patent: Dec. 21, 2004

(54) DATA STORAGE

(75) Inventor: Jonathan Peter Buckingham, Bristol (GB)

(73) Assignee: Hewlett-Packard Company, Palo Alto, CA (US)

(*) Notice: Subject to any disclaimer, the term of this patent is extended or adjusted under 35 U.S.C. 154(b) by 433 days.

(21) Appl. No.: 09/917,786

(22) Filed: Jul. 31, 2001

(65) Prior Publication Data
US 2003/0026020 A1 Feb. 6, 2003

(51) Int. Cl.[7] ................................................ G11B 5/09
(52) U.S. Cl. .......................... 360/48; 360/53; 360/31
(58) Field of Search ............................... 360/48, 31, 53

(56) References Cited

U.S. PATENT DOCUMENTS 4,001,883 A * 1/1977 Strout et al. ................... 360/48
6,288,862 B1 * 9/2001 Baron et al. ................... 360/55

* cited by examiner

Primary Examiner—Andrew Sniezek
Assistant Examiner—Dan I Davidson

(57) ABSTRACT

A data reader reads a medium holding user and non-user data that holds information relating to the user data. The reader has a read head that generates a data signal comprising user and non-user data. The user data is arranged into plural sets interspersed with the non-user data that identifies the user data within the sets. Processing circuitry receives and processes the data signal and obtains the user data from the data signal by using the non-user data to identify the user data within the data signal. The data reader is particularly suitable in situations having re-writes and overwrites.

30 Claims, 10 Drawing Sheets

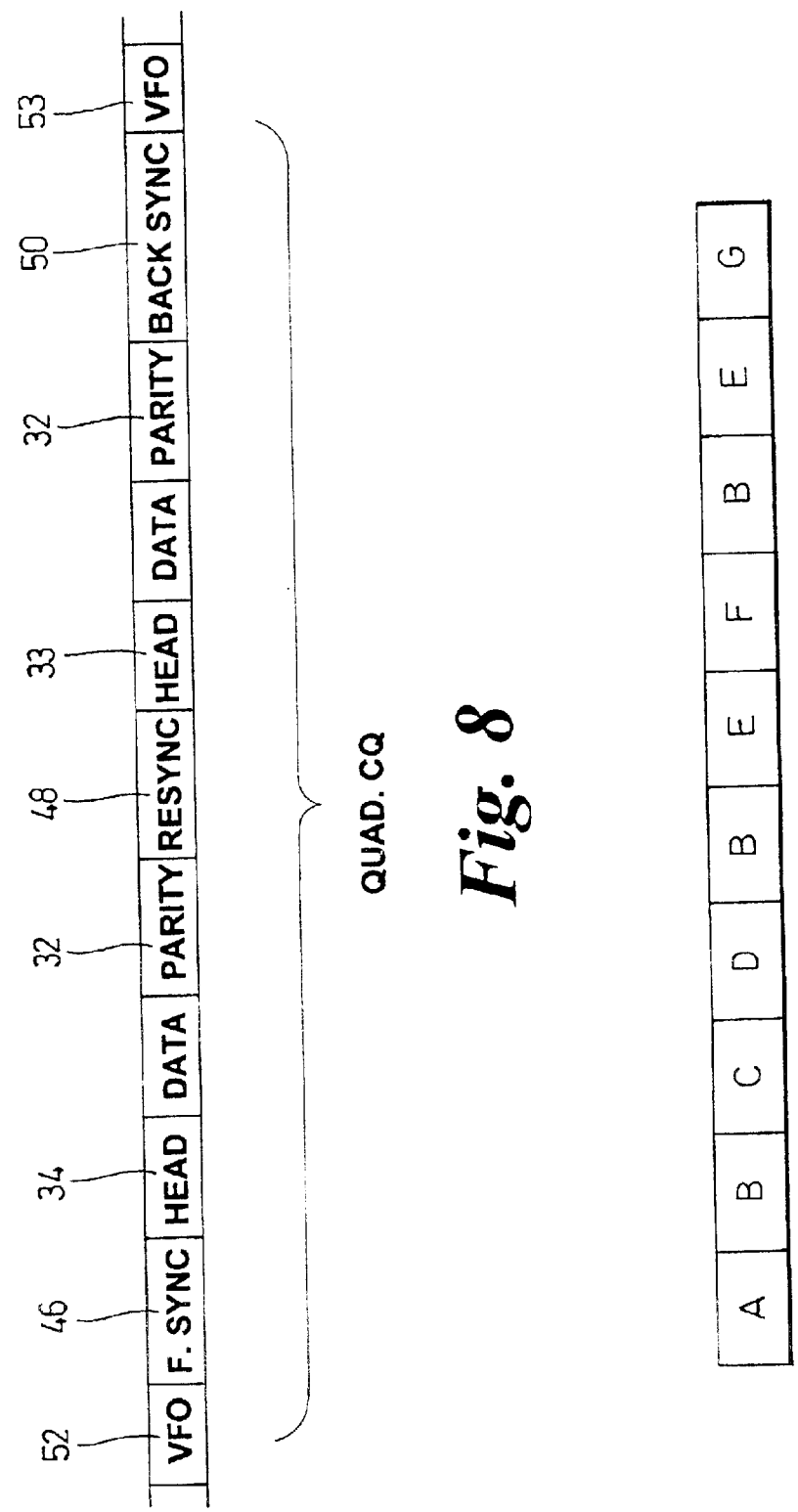

DATA STORAGE

FIELD OF THE INVENTION

This invention provides an improved data reader suitable for a data storage device, which may be a tape drive arranged to receive data from a computer, or the like. The invention also provides related methods and devices incorporating such a reader,

BACKGROUND AND OBJECTIVES

An example of a data storage device is the tape drive, which receive user data from computers, particularly, but not exclusively to back-up the user data held on the computer onto a data-holding medium. In such back-up applications it is of prime importance that the user data is retrievable, since generally, this copy is the back-up copy that will only be required if the original copy has been lost or damaged. Therefore, there is an ongoing need to ensure that backup data storage devices are as robust and secure as possible.

Once user data has been stored on the data-holding medium it can be held there for long periods. To recover the user data from the data-holding medium the data storage device must read the data-holding medium and regenerate the user data originally stored there. In some devices the user data backed-up on the dataholding medium accounts for only roughly 80% of the overall information held on the data-holding medium. The remaining roughly 20% of the information is header, error correction information that attempts to make the user data as secure as possible.

Therefore, in order to read the user data the storage device must accurately detect the user data within all of the information held on the data-holding medium. In view of the amount of information other than user data that is held on the data-holding medium, this can be problematic, It is known to provide markers, sometimes referred to as data separator fields (DSS fields), that identify when significant occurrences are about to happen within the information that is held on the data-holding medium. For example, it is known to provide a marker before a set of user data occurs on the data-holding medium. It is also known to provide non-user data, including header information that specifies the contents of portions of the user data.

It is an object of the present invention to provide a data reader suitable for a data storage device that addresses the problems discussed above.

SUMMARY

According to a first aspect of the invention there is provided a data reader arranged to read a data-holding medium containing data comprising both user and non-user data, set data being held in at least one set, and each said set being arranged into datasets, said non-user data holding information relating to said user data and being interspersed therewith, said data reader comprising at least one read head arranged to read said data-holding medium and generate a data signal comprising user data and non-user data, said non-user data being arranged to identify said user data within said sets, processing circuitry being arranged to receive and process said data signal and obtain said user data from said data signal using said non-user data to identify said user data within said data signal.

An advantage of such an apparatus is that it does not rely on a marker stored on the data-holding medium to identify the start of user data. Prior art data storage devices have relied on detecting this marker to identify that user data is about to occur. A problem with detecting the marker in this manner is that if the marker is not detected, or data is interpreted as the marker, then data can be lost.

Relying on the information held in the non-user data is advantageous because it can provide a more robust approach and therefore, is it less likely that data will be lost.

The sets of data may themselves be arranged into larger groupings, or datasets. The sets may be arranged on the data-holding medium such that the datasets may overlap one another. The processing circuitry may be arranged to occupy a state reflecting, whether or not the sets of data being read by the reader must be from the same dataset, or whether the sets are possibly from a plurality of datasets. I.e. the data is in an overlap zone in which datasets can overlap one another. An advantage of causing the processing circuitry to occupy such state is that it provides a convenient way of noting the nature of the data being read from the data-holding medium. The processing circuitry may be arranged to occupy a state in any one or more of the following manners: having a flag set, having a state machine in which the occupied state varies, setting a register, altering a memory location, etc.

In the preferred embodiment only two datasets can overlap one another, and therefore, two state machines are provided: one state machine provided in relation to each of the datasets.

Further, when data is written to the data-holding medium it may overwrite data already in existence on the data-holding medium. Data that overwrites existing data in this manner is generally written at the end of a dataset that exists on the data-holding medium. However, there may be a latency between a dataset finishing on the data-holding medium and the stat of the over written data, which can result in a portion of data from a dataset that should have been over written remaining. Therefore, at the end of each dataset on the data-holding medium there may be an overwrite zone in which a first dataset can finish and data from a second dataset can start before the first dataset has finished (due to the second dataset having overwritten the first). The processing circuitry may be arranged to occupy a state reflecting whether or not data being read from a data-holding medium is in an overwrite zone.

Further, the processing circuitry may be arranged to occupy a state arranged to reflect when data being read from a data-holding medium is beyond an overwrite zone.

A zone detector may be provided to interpret the non-user data and determine whether the user data must be from the same dataset, or could possibly be from a plurality of datasets. Preferable, the zone detector is arranged so that it controls the state of the processing circuitry.

The reader may comprise a plurality of read-heads, each of which is arranged to read a separate channel of data, preferably in parallel with one another. In the preferred embodiment the reader comprises 8 read heads, although the reader could comprise any number of read heads. For example the reader may comprise 2, 3, 4, 5, 6, 7, 9, 10, 11, 12, 13, 14, or more read heads. An advantage of providing more than one read head in this manner is that the rate at which data can be read from the data-holding medium is increased.

Conveniently, the reader comprises a controller that is arranged to determine whether user data read from the data-holding medium should be accepted and stored in a memory of the reader. Preferably, the controller includes the at least one state machine.

According to a second aspect of the invention there is provided a data storage device incorporating a data reader according to the first aspect of the invention.

In the preferred embodiment the data storage device is a tape drive. Such a tape drive may be arranged to read data held in any of the following formats LTO (Linear Tape Open), DAT, (Digital Audio Tape), DLT (Digital Linear Tape), DDS (Digital Data Storage), or any other format. Although in the preferred embodiment the tape is LTO format.

Alternatively, the data storage device may be my one of he following: CDROM drive, DVD ROM/RAM drive, magneto optical storage device, hard drive, floppy drive, or any other form of storage device suitable for storing digital data.

According to a third aspect of the invention there is provided a method of reading data from a data-holding medium containing user data held in a plurality of sets and interspersed with non-user data, said non-user data-holding information relating to said user data, the method comprising reading said non-user data to identify said user data within said sets and obtain said user data from said data-holding medium said method further comprising arranging said sets of user data into datasets, the identity of which are provided by the non-user data, and monitoring the non-user data to ascertain the identity of the dataset being read from the data-holding medium.

An advantage of such a method is that it does not rely on detecting markers as has previously been performed. In such marker detecting methods, user data can be lost if the marker is missed by the reader, the marker becomes damaged and is therefore not intelligible, or data is mis-interpreted as a marker.

Further, it is convenient to ascertain the identity of the dataset in addition to determining the identity of the sets of data within a dataset in order that it can be ascertained that sets of data being read from the data-holding medium belong to the same dataset.

It is possible that the datasets can overlap one another on the data-holding medium, so that at least one set of user data from a first dataset can occur in a region corresponding to a second dataset. The method may comprise determining whether data being read from the data-holding medium may be in a zone corresponding to where data may be from a plurality of datasets (an overlap zone).

The method may comprise monitoring the identity of the datasets being read from the data-holding medium and determining if more than two datasets have occurred within the overlap zone. It is possible for data from two datasets to occur within the overlap zone, this occurs if at least one set of data is re-written after writing of a second dataset has started. However, if a third dataset occurs in this region it is likely that an error occurs and therefore, it is advantageous to monitor the data-holding medium for such an occurrence.

If a third dataset is detected the method may comprise rejecting sets of data read from the data-holding medium that occur from the third or higher dataset that occurs within the overlap zone.

Alternatively, or additionally, the method may comprise rejecting sets of data from earlier datasets read from the data-holding medium within the overlap zone if more than two datasets occur within the overlap zone.

The method may be user configurable to allow either rejection of earlier datasets (and consequently acceptance of later datasets), or rejection of later datasets (and consequently acceptance of earlier datasets) if a third dataset is detected.

The method may comprise using the non-user data to determine when the end of a dataset has occurred. Determining when the end of the dataset has occurred may itself comprise timing from the end of the last set of user data within a dataset to ensure that no re-writes of the last or any other set of user data from that dataset are present on the data-holding medium. When data is written to the data holding medium any data that is written in error will be re-written. Due to latencies within the writing apparatus used to rite data to the data-holding medium such re-writes may well occur after the last set of data within a dataset.

Therefore, the end of the dataset will not occur until any rewrites have been read, It is advantageous to time from the last set of data within a dataset since such rewrites should occur within a predetermined period; once his period has expired no further re-writes should occur. Prior methods have relied upon detecting markers on the data-holding medium, which can be problematic if the marker is corrupted in any manner, or missed.

Conveniently the method comprises using the non-user data to determine if any of the sets of data from a dataset have been re-written and restarting the timing if any re-writes are detected once the last set of user data within a dataset has been read. Such a method is advantageous because if any of the sets of data have been re-written, these re-writes may themselves be re-written, which extends the period in which re-writes occur.

Preferably the method comprises asserting that data being read from the data-holding medium is in an exclusive zone, such that data should only occur from a single dataset, once the timing has reached a predetermined value.

Preferably, the method comprises using the non-user data to determine if any of the sets of data from a dataset have been written a plurality of times to the data-holding medium during writing of the data to the data-holding medium. Once it is determined that a set of data has been written a plurality of times the method may reject earlier sets of data from a dataset, read from the data-holding medium, in favour of a later received substantially identical set of data from a dataset. It will be appreciated if a set of data is re-written to the data-holding medium during writing thereto that although the original write of the dataset and subsequent re-writes should be the same when read back from the medium, they are likely to be slightly different due to the errors that caused the data to be re-written.

Alternatively, or additionally, the method may comprise combining an earlier set of data from a dataset, read from the data-holding medium, with at least one later received substantially identical set of data from a dataset. This is advantageous because it may allow a complete uncorrupted set of data to be reconstructed from a plurality of corrupted sets of data. The method may provide for selection of whether earlier sets of data are discarded, or combined with later ones.

Further, when data is written to the data-holding medium it may overwrite data already in existence on the data-holding medium. Data that overwrites existing data in this manner is generally written at the end of a dataset at exists on the data-holding medium. However, there may be a latency between a dataset finishing on the data-holding medium and the start of the overwritten data, which can result in a portion of data from a dataset that should have been over written remaining. Therefore, at the end of each dataset on the data-holding medium there may be an overwrite zone in which a first dataset can finish and data from an second dataset can start before the first dataset has finished (due to the second dataset having overwritten the first). The method may comprise detecting whether or not data being read from the data-holding medium exists in an overwrite zone.

Conveniently, the method comprises monitoring the non-user data to determine whether sets of data being read from the data-holding medium were written in the same pass. This is advantageous because it can be used to detect drop in data: when the data is written it is conveniently arranged such that an entire dataset is written on a single pass and therefore if sets of data within a dataset occur from more than a single write pass an error is likely to have occurred.

The method may monitor a portion of the non-user data that provides a numerical value representing the pass on which the set of data being read was written, further comprising detecting whether the numerical value is altered for neighboring sets of data. Such a method provides a convenient manner in which to check for sets of data being written on more than one pass.

The method may comprise using a state machine to monitor the zone into which data being read from the data-holding medium falls. An advantage of using a state machine in this manner is that is that it provides a convenient structure to track the zone.

According to a fourth aspect of the invention there is provided a computer readable medium having stored therein instructions for causing a processing unit to execute the method of the third aspect of the invention.

The computer readable medium, although not limited to, may be any one of the following: a floppy disk, a CDROM, a DVD ROM/RAM, a ZIP™ disk, a magneto optical disc, a hard drive, a transmitted signal (including an internet download, file transfer, etc.), According to a fifth aspect of the invention there is provided a data reader arranged to read a data-holding medium containing first and second markers in addition to user data, said data reader comprising at least one read head arranged to read the data-holding medium and generate a data signal corresponding to said first and second markers, and said user data, the data reader further comprising processing circuitry arranged to receive said data signal and obtain said user data from said data-holding medium wherein, the processing circuitry is arranged to identify said user data without reference to said first marker.

An advantage of such a data reader is that by not detecting the first marker can make the data reader simpler to implement. As such it may be easier to configure, and may be more reliable. Reliability is an important consideration for certain applications in which a data reader may be used (for example in data backup applications, in which data recovery and reliability are important issues).

There now follows by way of example only a detailed description of the invention with reference to the accompanying Figures of which:

FIG. 8 shows yet further detail of how data is written to the tape;

FIG. 9 shows how neighboring data blocks can be arranged on a tape, after read while write retries have occurred;

Figure 11:
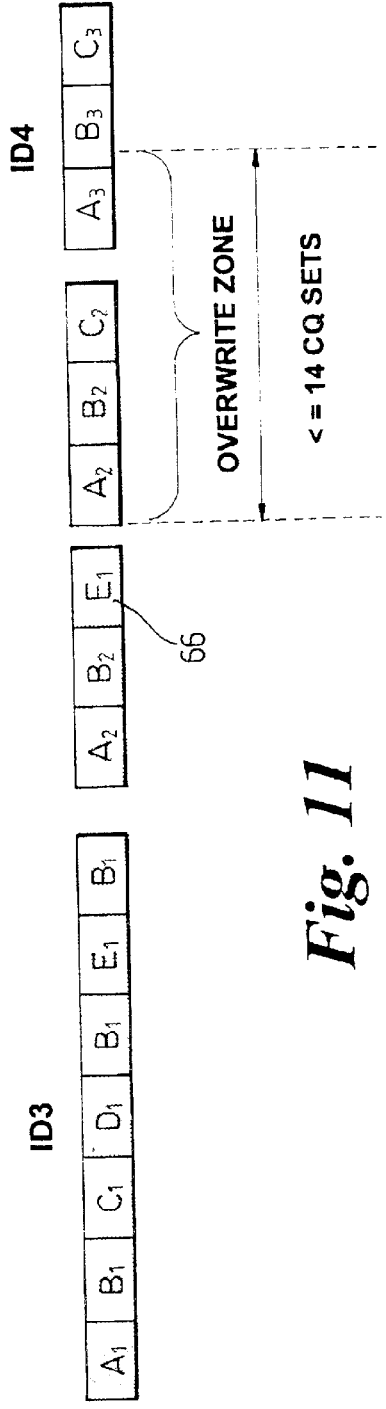
Figure 12:
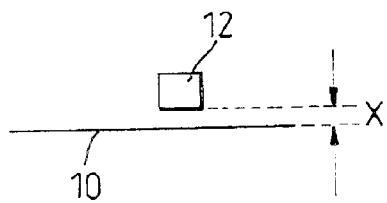
Figure 13A:
Figure 17:
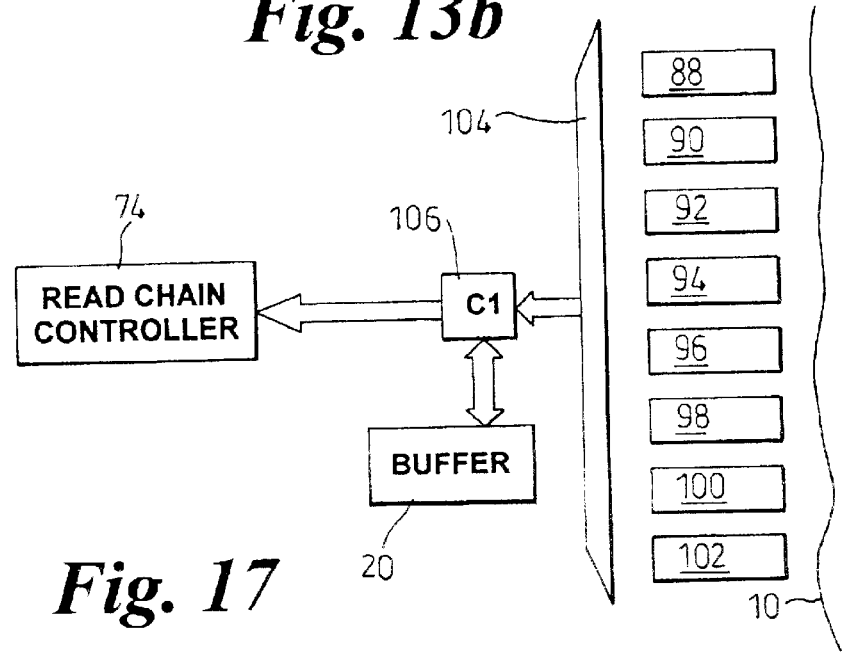
Figure 14:
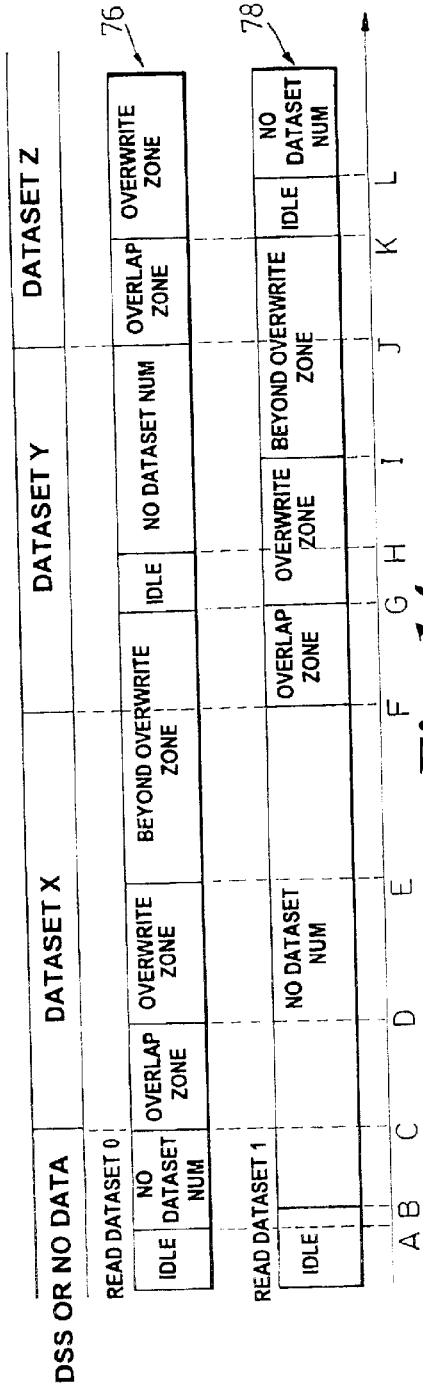
Figure 15:
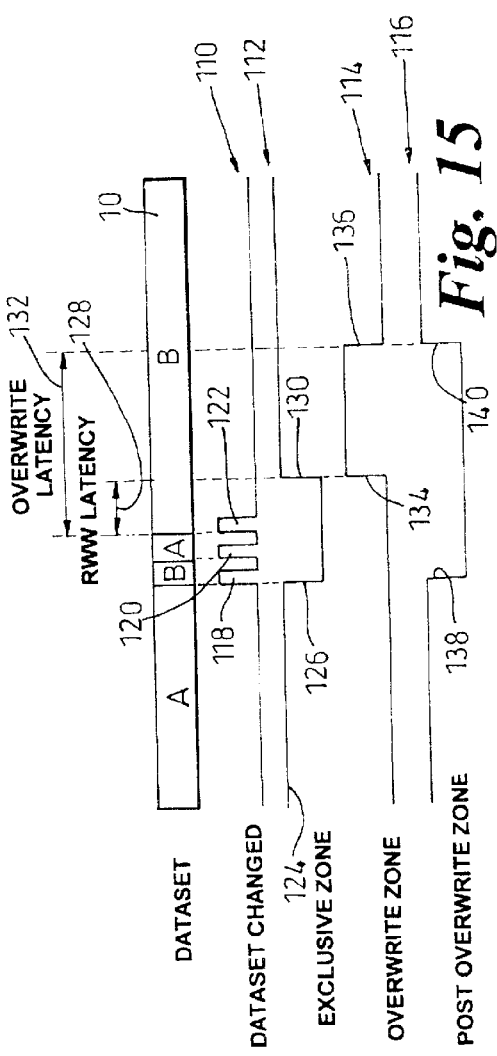
Figure 16:
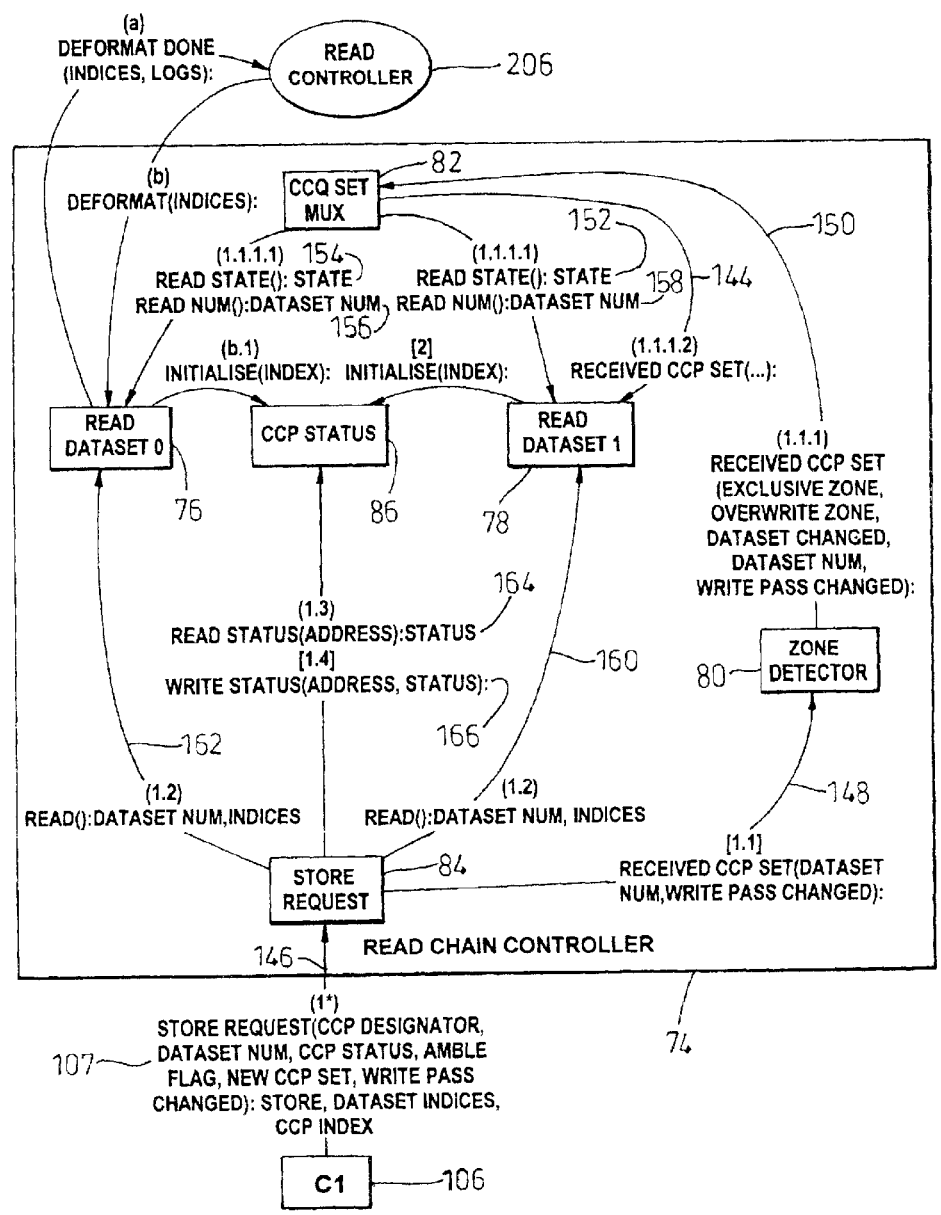
Figure 18:
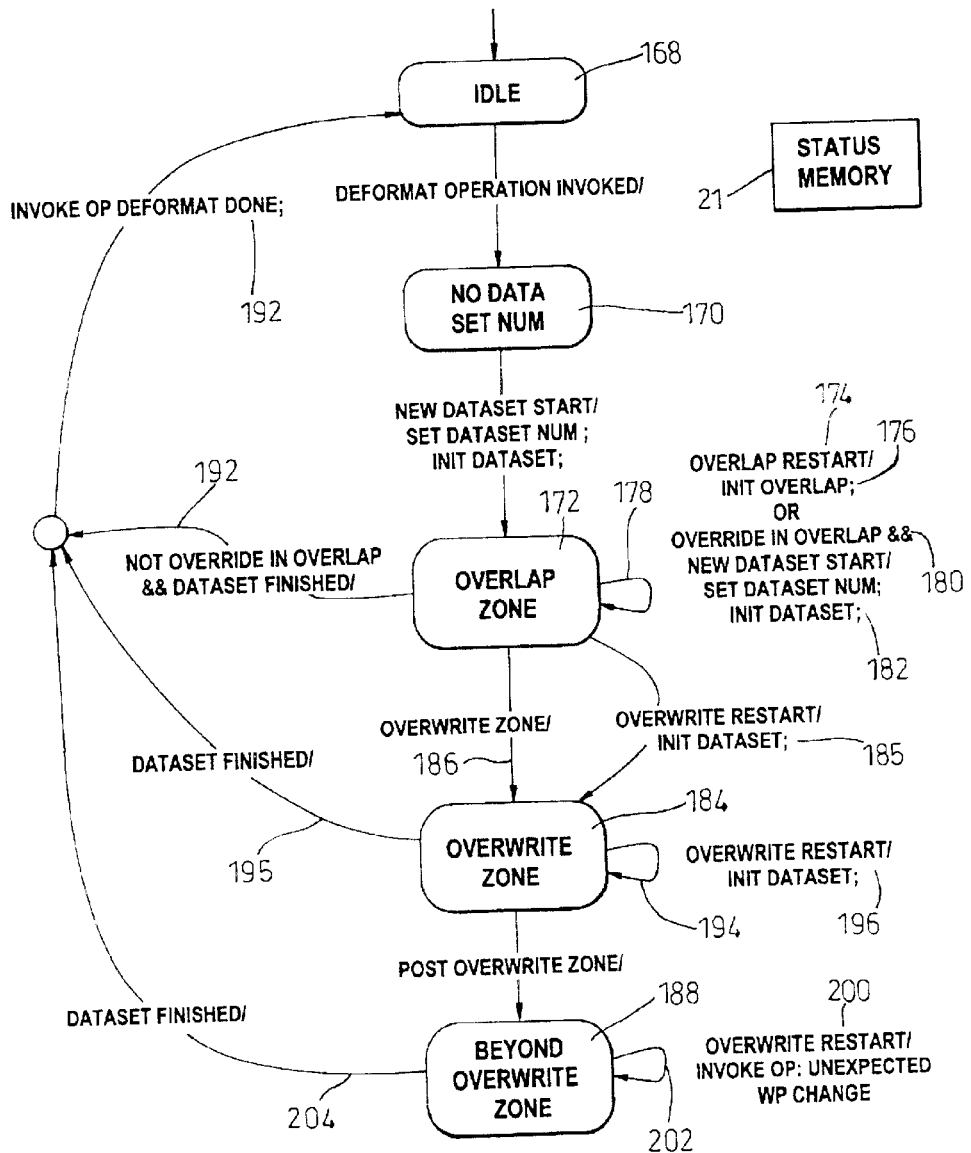

FIG. 12 schematically shows the position of a read head in relation to a tape;

FIGS. 13a and b schematically show problems that may occur with a signal read from a tape;

FIG. 14 shows further detail of FIG. 11;

FIG. 15 shows details of signals produced within the tape drive and used to control the reading of data;

FIG. 16 schematically shows hardware blocks within a portion of the electronics of the tape drive;

FIG. 17 shows a block diagram of the initial processing circuitry for reading data from a tape inserted into the tape drive; and FIG. 18 shows a state diagram for portions of FIG. 16,

DETAILED DESCRIPTION

Figure 1:
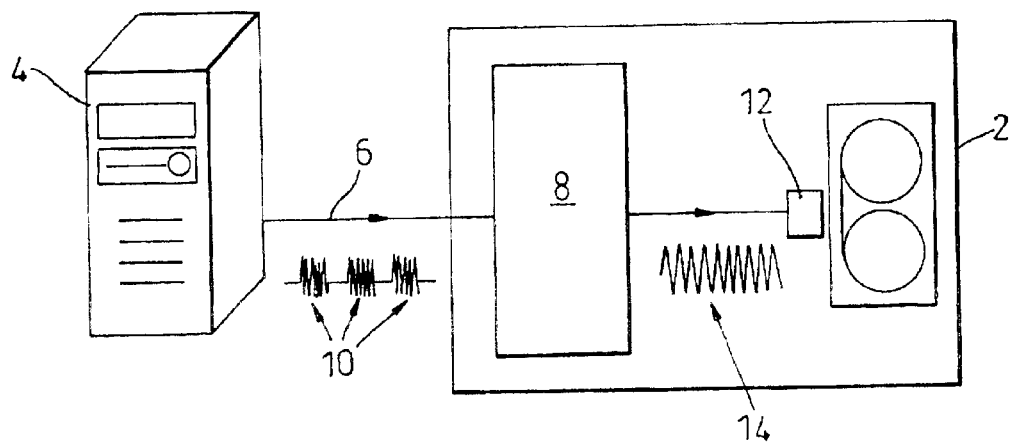
FIG. 1 is a schematic diagram of a computer connected to a tape drive according to the present invention.

Turning to FIG. 1, a tape drive 2 is shown connected to a computing device 4. The computing device 4 may be any device capable of outputting data in he correct format to the tape drive 2, but would typically be a device such as a computer referred to as a PC, an APPLE MAC™, etc. These machines may run a variety of operating systems such as for example MICROSOFT WINDOWS™, UNIX, LINUX, MAC OS™, BEOS™. Generally, because of the high cost of the tape drive 2 it would be connected to a high value computer such as a network server running WINDOWS NT™ or UNIX.

A connection 6, in this case a SCSI link, is provided between the computing device 4 and the tape drive 2, which allows data to be transferred between the two devices. The tape drive 2 contains control circuitry 8, which includes a buffer capable of receiving and buffering data received from the computing device 2. A tape 10 has been inserted into the tape drive and is capable of having data written thereto and read therefrom by a set of write and read heads 12. In this embodiment there are eight read and eight write heads. The tape drive corresponds to the LTO format and typically receives tapes having a capacity on the order of 100 Gbytes.

The processing circuitry further comprises memory into which data read from the tape is stored whilst it is being decoded, together with electronics that is arranged to read and decode data from the tape 10.

Data sent by such computing devices is generally sent in bursts, which results in packets of data 10 that need to be smoothed in order that they can be sequentially recorded by the tape drive. Therefore, the buffer within the control circuitry 8 buffers these bursts and allows data to be continuously 14 written to the tape 10.

Figure 2:
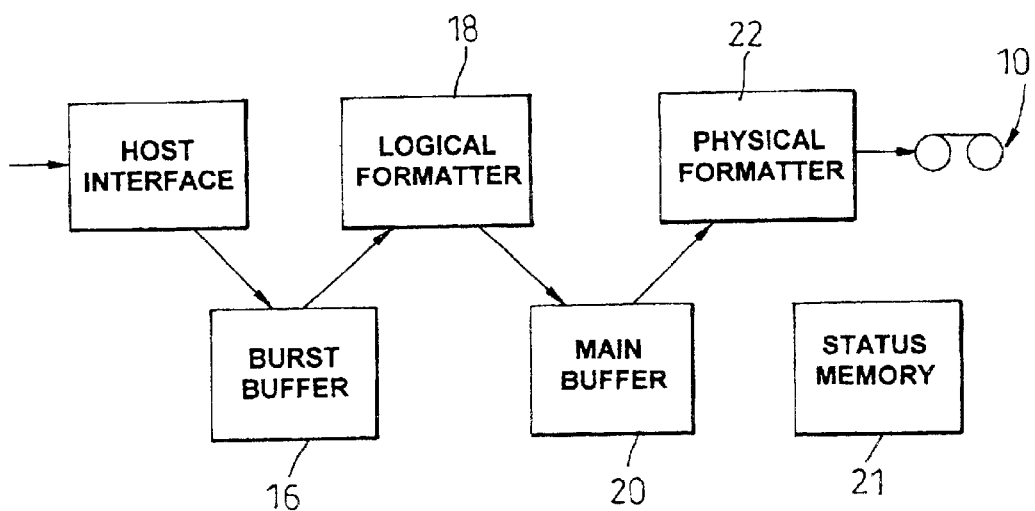
FIG. 2 is a schematic diagram of the tape drive shown in FIG. 1, showing the main components thereof.

FIG. 2 shows a number of portions of the control circuitry 8 in more detail. The computing device 4 is represented by the left most box of the Figure, as the host interface. The control circuitry 8 comprises a burst buffer 16 that is arranged to receive data from the computing device 4. A logical formatter 18 is provided to perform initial processing of the data received by the burst buffer 16. A main buffer 20 is provided and arranged to hold data that is waiting to be written to the tape 10, and also holds data that is being read from the tape 10 before being sent to the computing device 4. A small amount of status memory 21 to hold status information during processing of received data is also provided. The final block shown in FIG. 2 is the physical formatting block 22, which performs further processing on the data before it can be written to the tape 10, some details of which will be given below.

Data received by the tape drive 2 from the computing device 4 is first passed to the burst buffer 16. The burst buffer 16 is required to ensure that the tape drive 2 can receive the high speed bursts of data sent by the computing device 4, which may otherwise be received too rapidly for the logical formatter 18 to process in time. The burst buffer 16 is of a First In First Out (FIFO) nature so that the order of the data is maintained as it is passed to the logical formatter 18.

The logical formatter 18 compresses the data received, arranges it into the data structure described hereinafter, and adds a first level of error correction codes (C1 error correction). Once the data has been processed in this manner it is passed to the main buffer 20, also of a FIFO nature, to await being written to the tape 10. The capacity of the main buffer 20 is much greater than that of the burst buffer 16 so that it can act as a reservoir of information should data be received from the computing device 4 at too great a rate, and can be used to allow writing to continue should data transmission from the computing device 4 be suspended.

The physical formatter 22 handles the writing of the data to the tape 10, which includes read while writing retries (RWW reties), generation of a second level of error correction (C2), generation of headers, RLL modulation, sync. fields, and provides data recovery algorithms. These terms will be expanded upon hereinafter.

Figure 3:
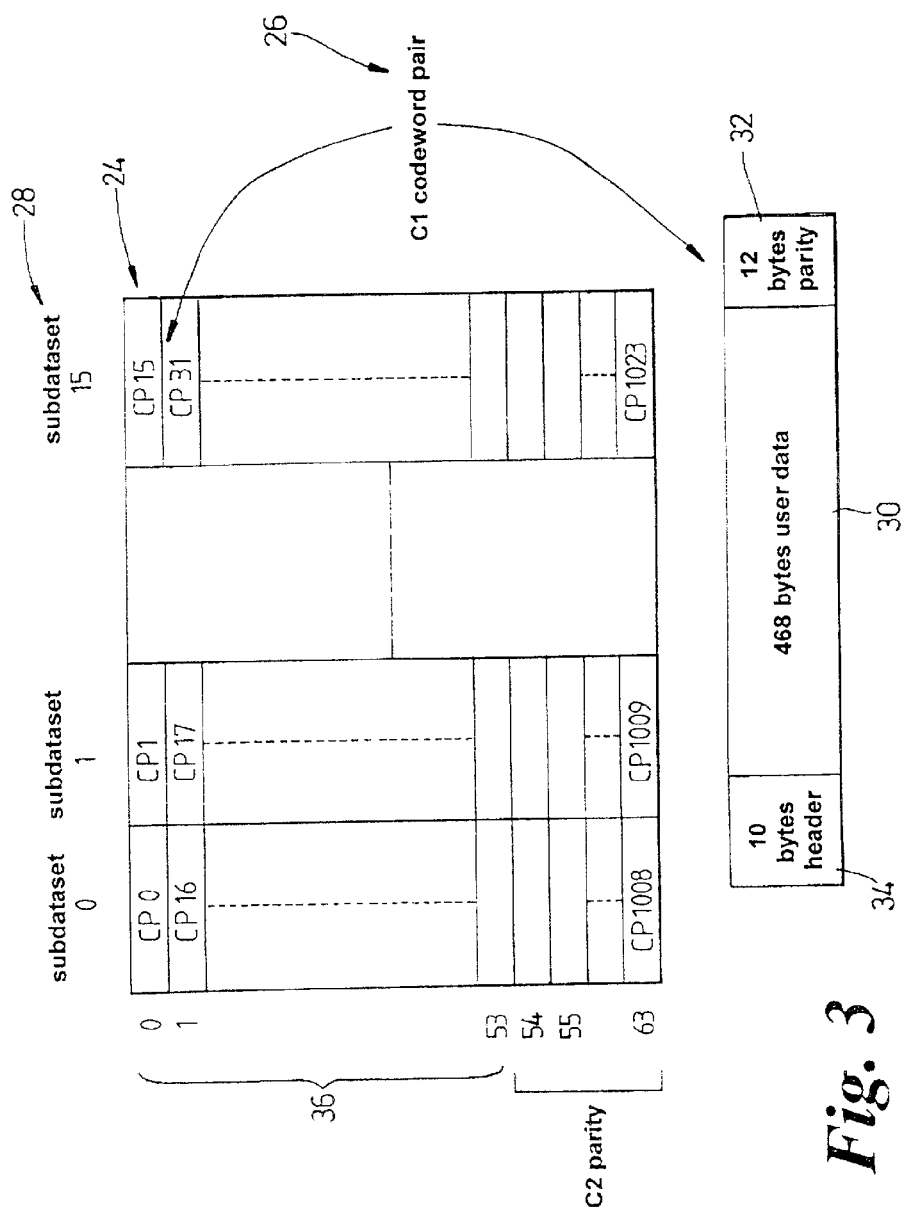
FIG. 3 shows the structure into which data received by the tape drive is arranged.

The logical formatter 16 arranges data that it receives in the data structure 24, or dataset, as shown in FIG. 3, details of which are as follows. The dataset typically holds 400 Kbytes of compressed data, and comprises a matrix of 64×16 C1 code word pairs (CCP) 26 and there are therfore 1024 CCP's, or sets of data, within a dataset. Each column of the matrix is referred to as sub-dataset 28, and there are thus 16 subdatasets within a dataset.

Each CCP, or set of data, as its name suggests, comprises two code words, each containing 234 bytes of data user data, together with 6 bytes of parity information, which allows the detection and correction of 3 bytes in error with any codeword. Therefore, each CCP comprises 468 bytes of user data 30 and 12 bytes of parity information 32. The CCP is also headed by a 10 byte header 34.

Rows zero to fifty-three 36 of the dataset 24 hold user data, whilst rows fifty-four to sixty-three hold data providing the second level of error correction generated by the physical formatter 22. (Rows zero to fifty-three 36 are generated by the logical formatter 18, whilst the physical formatter 22 adds the error correction data held in rows fifty-four to sixty-three).

Figure 4:
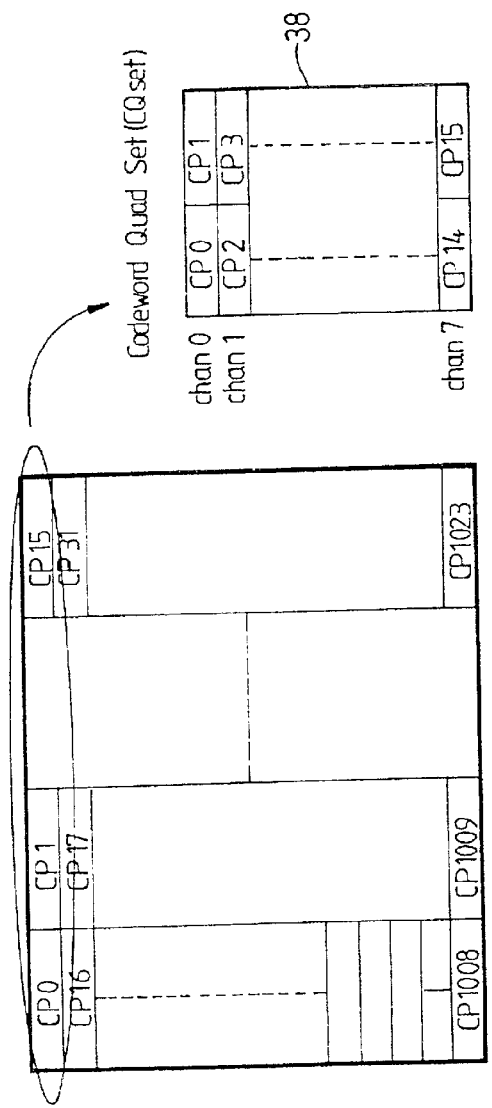
FIG. 4 shows further detail of the data structure of FIG. 3 and how the data contained therein is written to a tape.
Figure 5:
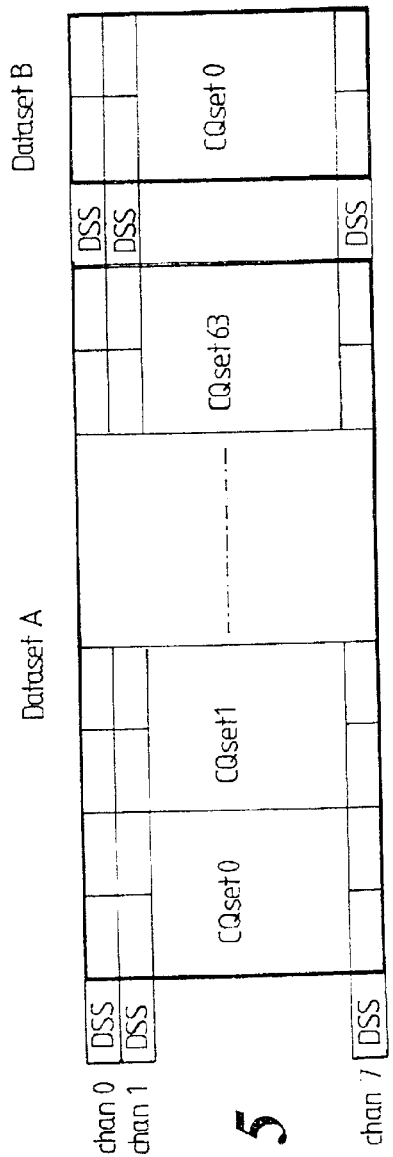
FIG. 5 shows further detail of a portion of the data structure shown in FIGS. 3 and 4, and shows the physical arrangement of the dataset on the tape.

When the physical formatter 22 writes data to the tape 10 it writes each of the datasets in turn, as a code word quad set (CQ set) 38, as shown in FIG. 4. That is row zero is written first and when this is complete row one written, etc. As shown in FIG. 4 a CQ set 38 can be represented as a 2 column by 8 row matrix, with each cell of the matrix containing a code word pair from a column of the dataset. Each row of the matrix is written by a separate one of the 8 write heads 12, thus splitting the CQ set 38 across the width of the tape 10. Therefore, the 1024 code word pairs from the dataset 24 are written as 64 CQ sets, as shown in FIG. 5. Each row to the CQ set 38 is written by a separate one of the write heads (chain 0 to chain 7). Between each dataset (every $64^{th}$ CQ set 38) a dataset separator DSS is recorded on the tape 10.

Figure 6:
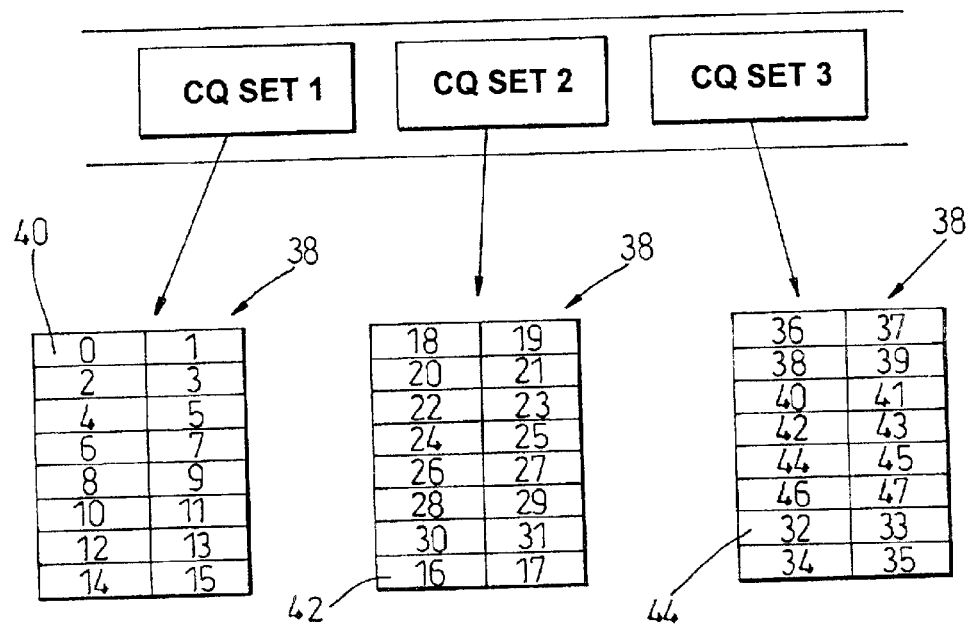
FIG. 6 shows how data is written on a tape inserted into the tape drive of FIG. 1.

To further ensure the security of data written to the tape 10 the order of the codeword pairs written in each CQ set 38 is rotated between one CQ set 38 and the next, as shown in FIG. 6. This ensures that the C2 error correction data is spread across the tape 10. Thus, the earliest codeword 40 pair from the first CQ set 38 to be written from a dataset i.e. codeword 0 is written by channel 0. For the next CQ set 38 the earliest codeword pair 42, i.e. codeword 16 is written by channel 7. For the next CQ set 38 the earliest codeword pair 44, i.e. codeword 32 is written by channel 6. This rotation continues as CQ sets 38 are written to the tape 10.

Figure 7:
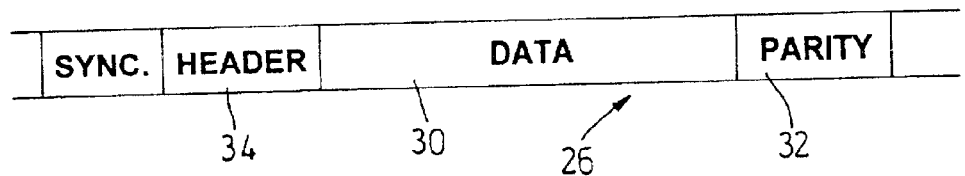
FIG. 7 shows more detail of how data is written to tape.

As described in relation to FIG. 3 each of the codeword pairs has a header 34. When data is being read from the tape the reading of this header is essential to ensure that the following data can be correctly read. Therefore, a sync. field is added by the physical formatter 22 as the codeword pairs 26 are written to tape. This is shown in FIG. 7 and in more detail in FIG. 8.

As shown in FIG. 8 three separate sync. fields are used: a forward sync. 46, a resync. 48 and a back sync, 50. The forward sync. 46 is positioned before the header 34 of the first codeword pair 26 of a CQ set 38. The resync. 48 is positioned between the two codeword pairs 26 of a CQ set 38 (i.e. after the parity data 32 of the first codeword pair 26 and before the header 33 of the second codeword pair 26). The back sync. 50 is positioned after the parity data 32 of the second codeword pair 26 within the CQ Set 38.

The forward sync. 46 is preceded by a vfo 52 field which comprises the data 000010 followed by a number of occurrences of the bit sequence 01010. The back sync. field 50 is followed by a vfo field 53 that comprises the data 00010 followed by a number of occurrences of the bit sequence 010101 These vfo fields 52, 53 are easily detectable by the processing circuitry reading data from the tape 10, and alerts it to the fact a forward sync. field 46 is to follow. The portion of the tape comprising the forward sync. 46 to a back sync. 50 comprises a CQ set 38. The headers 33, 34 contain information as to the identity of the data and the reading of the headers determines how the processing circuitry decodes the data.

Each of the write heads is associated with a read head, such that once data is written it is read in order to verify that the data was written correctly. If it is determined that an error occurs n writing the data then the CQ set 38 in which the error is found is re-written, and this is represented in FIG. 9, and the process is termed Read While Writing (RWW). In FIG. 9 the CQ sets 38 are represented by the letters A to G.

When data is read back and found to be in error there is a latency between the data first being written and then rewritten. Therefore, the second writing of the CQ set 38 does not consecutively follow the first, and this can be seen in FIG. 9. The first writing of CQ set 38 B is the second CQ set 38 of the Figure. However, this writing was found to be in error by the RWW process and thus the CQ set 38 B was rewritten. By studying the Figure it is apparent that the re-write did not occur until a further two CQ sets 38 (C and D) had been written. Further, this re-write was found to be in error and a further write required, again after a further two CQ sets 38 (E and F) have been written. It is possible for up to seven CQ sets 38 to be written in between writes of a CQ set 38 written in error.

The tape drive will make a maximum of 128 re-writes within any one dataset. Therefore, the same CQ set may be re-written 128 times, 128 different CQ sets may be re-written once, or any permutation may occur between these two extremes.

Each time that data is rewritten in the manner described above, it is rotated compared to the previous attempt, as discussed in relation to FIG. 6. Such rotation is performed in case one or more of the write heads does not perform as well as should be expected. Since the data is being rotated, it is being written by a different write head on each write attempt. Therefore, by reading the available data from each of the rewrites, it should be possible to reconstruct the CQ set and recover the data.

Figure 10:
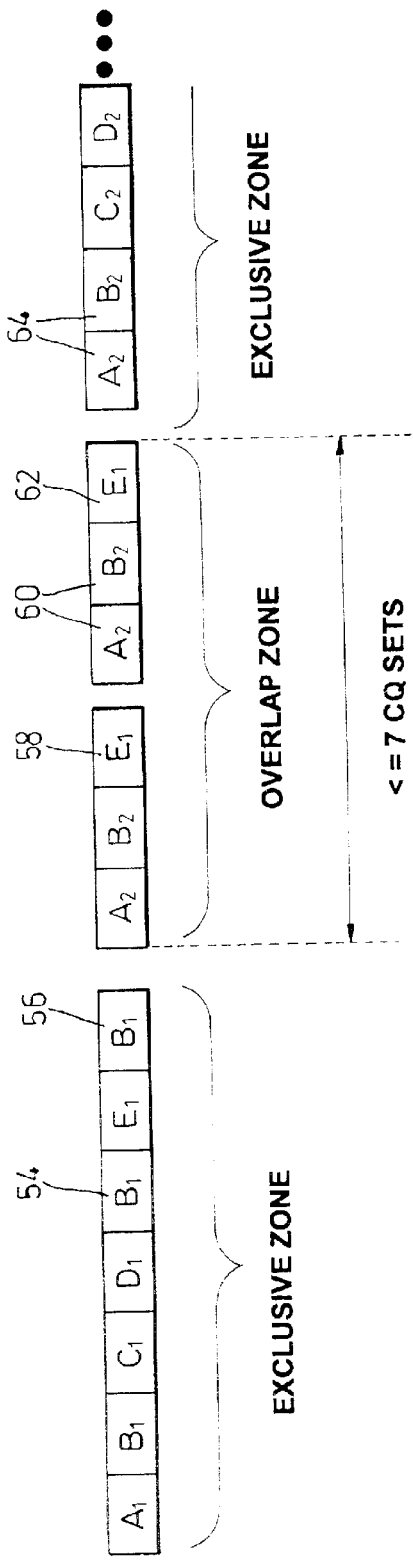
FIGS. 10 and 11 show further details of how the data blocks can be arranged on a tape.

As will be appreciated from the description in relation to FIG. 5, a first dataset 24 is followed closely on the tape 10 by a second dataset 24, and thus, should CQ sets 38 from the end region of one dataset 24 need re-writing due to RWW error detection then they could be written into a region of the tape 10 to which data from a following dataset 24 is being written, Thus, as shown in FIG. 10 data is being written from a first dataset 24, which has been referenced with the subscript 1. CQ set 38 $B_1$ is written in error and thus is written a second time 54. This re-write is also in error and is written a third time 56. CQ set $E_1$ is the last CQ set 38 from this first dataset, and thus once it has been written (and after a DSS field has been recorded) the following dataset is started by CQ set 38 $A_2$. However, CQ set 38 $E_1$ from the first dataset was written in error and is therefore re-written 58. This rewriting occurs in a region in which the data originates from the second dataset. Because of this re-writing of a CQ set 38 from the first dataset in a region corresponding to the second dataset, rewriting of the second dataset must recommence, and thus CQ sets 38 $A_2$ and $B_2$ are re-written 60, after a further DSS field has been recorded. However, the second writing of $E_1$ was also in error and thus it is re-written 62, causing the re-writing of $A_2$ and $B_2$ 64 before CQ set 38 $C_2$ can be written for the first time, again after a DSS field has been written. Thus, when the writing of a dataset commences it is not known whether writing will have to be halted and restarted until the period in which rewrites from the previous dataset can occur has expired.

The re-staring of the writing of a dataset as described above must be accounted from when data is being read from the tape 10. Once a dataset has been finished there is a period of up 7 CQ sets 38 in which data from the preceding dataset can be encountered. When data is being read from the tape 10 and the read heads are positioned such that data can only be present from a single dataset (i.e. the possibility of rewrites from a previous dataset has passed) then this is termed an exclusive zone. When the tape is positioned such that the read heads are reading data from one dataset, but there is the possibility of data occurring from a previous dataset then this is termed an overlap zone.

It is possible to selectively overwrite data that has previously been written to the tape 10. For example a user may specify that certain files should be overwritten because they are no longer required. This causes further considerations that must be overcome when writing to the tape and subsequently reading back what has been written to the tape. This is process is expanded upon in relation to FIG. 11.

Portions of FIG. 11 are identical to corresponding portions of FIG. 10. Shaded portions of FIG. 11 represent data that has been written to tape on a previous occasion, whilst unshaded regions represent data that is subsequently written.

Previously a first dataset has been written to tape. In this first dataset the CQ set 38 labelled $B_1$ was re-written twice before the end of the dataset is reached. Writing of a second dataset commenced with CQ set 38 $A_2$, and writing of the second dataset was halted by the re-writing of a CQ set 38 $E_1$ from the first dataset. In FIG. 11 the re-writing of CQ set 38 $E_1$ occurred only once, after which writing of a second dataset commenced, labelled $A_2$, $B_2$, $C_2$.

However, unlike the writing process described in relation to FIG. 10 it has been determined that new data should overwrite the second dataset (i.e. any dataset with subscript 2 should be over written). Therefore, once the end of the first dataset has been spotted i.e. after the occurrence of the second writing of CQ set $E_1$, labelled 66 overwriting by a third dataset $A_3$, $B_3$, $C_3$ occurs. However, due to latencies within the tape drive 2 there may be a period of upto 14 CQ sets 38 between the end of the first dataset and the commencing of writing of the third dataset. Therefore, as can be seen in the FIG. $A_2$, $B_2$, $C_2$, from the second dataset remain, and are not over written.

This latency needs to be taken into account when data is read back from the tape 10. Once the end of a dataset has been identified the period of 14 CQ sets 38 occurs in which overwrites of the existing data can occur and this period is referred to as the overwrite zone. Existing data from a dataset that it is desired to overwrite can be left on the tape, as is shown in FIG. 11 which still shows CQ sets $A_2$, $B_2$, $C_2$, from the second dataset as being present Therefore, when data is written it is assigned a write identity, or write pass number. Thus, when the first and second datasets of FIG. 11 were written they were assigned the write identity ID3 (which corresponds to the shaded region). When the third dataset was written over the top of the second dataset it was assigned the identity ID4. This will be expanded upon hereinafter.

There are further considerations that must be accounted for when reading data from the tape 10 and these are explained in relation to FIGS. 12 and 13. When writing data, the physical separation X between the write heads 12 and tape 10 can vary. If the write head 12 moved away from the tape 10 when data was being written (i.e. X increased), then when that data is read back the signal strength at the point corresponding to the increase in X during writing will be much weaker. This is represented in FIG. 13a in which the signal 68 is weakened in the region 70. Such regions are referred to as regions of drop out. The increased distance X can be caused by a number of factors, including the presence of dirt on the tape 10 and the ripples in the tape 10.

Figure 13B:
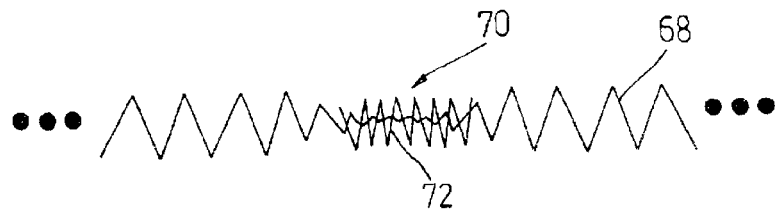

Whilst the tape 10 contains no information then a drop out region 70 simply results in a loss of signal during reading, and would generate a read while writing retry. However, if the tape 10 contained information that was being overwritten then because of the reduced field during writing the existing data would not be erased and would remain on the tape 10 and this is shown in FIG. 13b, The new signal 68 is shown with a drop out region 70 as in FIG. 13a, but an existing signal 72 remains in this drop out region. This existing signal is referred to a region of drop in.

Drop in regions must be accounted for during reading of information from the tape 10, and the write pass number described above is used to achieve this. All data that is written to the tape 10 is written with a write pass number, which for a particular tape is incremented each time data is written thereto. Consequently, a drop in region of existing signal 72 will have a lower write pass number than the newer signal 68 that surrounds it. When data is being read from the tape 10 if the write identity drops dung the middle of a dataset it is known that a region of drop in has been encountered.

The preceding situations must be accounted for if data is to be successfully read from the tape 10. The control circuitry 8 contains a read chain controller (or controller) as shown at 74 in FIG. 16, which for simplicity shows a snapshot of operations occurring therein. This module object diagram shows the reading of data back from the tape 10.

The notation for the operations shown in FIG. 16 follows a specified format as follows:

1. The number in the brackets in the first row of the operation gives the order of the operation. An operation can contain a number of sub-levels as indicated by full stops within the number. A sub level must complete before the higher level can move to the next step. For example, looking at FIG. 16 the store request operation is number 1. This operation has a number of sub levels, the first of which is 1.1 (the received CCP set operation), which must complete before moving to 1.2 (read ( )). Operation 1.1 also has a number of sub levels. If there were no further sublevels after 1.1 then the read chain controller could move to operation 2 (initialise).
2. Next, the name of the operation is given. For example store request, received CCP set, etc.
3. The name is followed be the parameters that the operation passes to the next block, which are given within the parentheses that follow the name.
4. After the parameters that are passed by the operation, a list of the parameters that are returned by the operation call are specified. These return parameters follow the colon in the middle of the operation definition.

If any of the information is null e.g. no parameters are passed or returned, that field is left blank.

Further, the shape of the cell within the object/module diagram represents whether the cell represents a hardware, or software, process: elliptical for software, rectangular for hardware.

The shape of the parentheses shows whether a process is optional or mandatory: square brackets are optional, and round brackets are mandatory. Therefore, [1.1]may not be invoked since it is optional, and will only be invoked for the first CCP in a CCP set (i.e. when new CCP set ="1"). Once [1.1]has been invoked (1.1.1) is mandatory and will always be invoked.

The object/module diagram shows a number of blocks, each performing a specific function:

Two identical read dataset block 76, 78, each of which controls the reading and deformatting of a single dataset. Two read dataset blocks are required so that the presence of two datasets within an overlap zone can be correctly handled and each functions according to the state machine diagram in FIG. 18.

A zone detector block 80, that is arranged to output a signal identifying whether data read from the tape is in an exclusive zone, an overlap zone, or an overwrite zone, as described above, A CCQ set multiplexer block 82 that determines to which of the read dataset blocks 76, 78 received data should be sent.

A store request block 84 that receives data from circuitry external to the state machine 74, and routes the data appropriately.

A CCP status block 86, which maintains the status of the CCP set that is currently being read from the tape 10.

The CCP status block 86 has a flag (CCP status) for each CCP of each dataset, which indicates: 1 has the CCP set been received, and 2. whether the CCP set has 0, 1 or 2 codewords therein that were uncorrectable by the C1 error codes.

FIG. 17 schematically shows the circuitry that allows data to be read from the tape 10 and passed to the read chain controller 74 of FIG. 16. The tape 10 contains 8 tracks and therefore there are 8 read heads 88, 90, 92, 94, 96, 98, 100, 102; one for each track each of the read heads 88, 90, 92, 94, 96, 98, 100, 102 passes data to a multiplexer 104 that multiplexes the 8 data streams and passes it to a processing block 106.

The processing block 106 communicates with the buffer 20, and the read chain controller 74, and performs Reed Solomon error correction at the first level of error correction described above (C1) on the data that has been read. Once the error correction has been performed the processing block 106 invokes a "store request" operation 107, which passes information to the read chain controller 74. The processing block 106 does not decode the data that it has received and simply passes the data header, and the status of the error correction that it has performed to the read chain controller 74 using the store request operation 107. The data is held in the processing block 106 until the result of the store request operation 107 is received from the remainder of the read chain controller 74. As will be described hereinafter the result of the store request operation informs the processing block 106 whether or not the data should be stored (provided by the "store" flag), and if it should, the address in the main buffer 20 where it should be stored (provided by the dataset indices, and CCP index).

A firmware read controller 206 controls the hardware read chain controller 74 and instructs the appropriate state machine 76, 78 to deformat received datasets. Such a deformat operation passes as its parameters indices, and receives back a deformat done operation from the state machine 76, 78. The indices give the location of a particular dataset within the main buffer 20, and are eventually passed to the processing block 106 allowing the data that the processing block 106 is temporarily holding to be stored in the main buffer 20.

When the processing block 106 invokes the "store request" operation it forwards the data header together with status information (results of C1 error correction) to the store request block 84. (The basic information allows the data to be identified and is passed as parameters of the operation). FIG. 16 shows only a snapshot of the operations, and all operations invoked on/by read dataset 0 will also be invoked on/by read dataset 1 at some stage, and visa versa.

When store request block 84 sees that the "new CCP set" parameter is set to "1" in store request operation 107, called by the processing block 106, it invokes an operation "received CCP set" 148 on the zone detector 80. When the "received CCP set" operation is completes the store request block 84 determines the results of the store request operation 107.

The store request block 84 only sends some of the basic information that has been, received to the zone detector 80. The information that is sent allows the zone detector to determine whether the data being read is in an exclusive zone, or an overwrite zone, and whether the dataset number has changed (which is determined by looking at the "write pass changed" flag). The output of the zone detector 80 is shown in FIG. 15.

FIG. 15 shows a representation of the tape 10, on which (reading from the left of the tape to the right) dataset A has been written, dataset B has started being written before being interrupted by a re-write from dataset A, subsequently the writing of dataset B restarts uninterrupted. The zone detector 80 has four outputs: dataset changed 110; exclusive zone 1127 overwrite zone 114; post overwrite zone 116. The zone detector outputs 110, 112, 114, 116 are set to logic zero or one according to the following parameters (the outputs remain valid for as long as the store request operation 107 from the processing block 106 is being processed).

Every time that the dataset changes, the dataset changed output 110 is taken from logic zero to logic one. In the example shown in FIG. 15, this occurs when writing of dataset A finishes 118, when the re-writing of dataset A starts 120 (i.e. when the initial writing of dataset B finishes), and when the re-writing of dataset A finishes 122 (i.e. when the writing of dataset B re-starts).

The exclusive zone output 112 is set to logic one when the data on the tape 10 is in an exclusive zone. Therefore, towards the end of the writing of dataset A, the exclusive zone output is set to logic one 124. When the dataset on the tape changes from A to B the exclusive zone output is taken from logic one to logic zero 126, and remains at logic zero until the RWW latency 128 (7 CQ sets as discussed above) has expired from he last change of dataset. In this example the last change of dataset is when the re-writing of dataset A occurs and re-writing of dataset B restarts and, thus, the exclusive zone output is taken high after the RWW latency has passed from this point 130.

The overwrite zone output 114 is held at logic one when the dataset being read from the tape 10 is in an overwrite zone. As discussed above, data can be overwritten, but the overwriting process can miss the start of a dataset that it is desired to overwrite, and start recording at period later. This period is termed the overwrite latency 132 and in the present embodiment is 14 CQ sets. The overwrite latency is timed from the start of writing of a new dataset. Thus in the example shown in FIG. 15 the counter would have started when writing of dataset A finished and writing of dataset B started for the first time. However, the counter would have been reset by the re-write from dataset A, and restarted again by the start of writing of dataset B. The overwrite zone output 114 is not taken high 134 until the exclusive zone output 112 is taken high 130 indicating that the exclusive zone has started. The overwrite zone output 114 is taken low again 136 when the overwrite latency 132 from the beginning of the dataset has passed.

The post overwrite zone output 116 is taken to logic one when the data being read from the tape 10 is not in an overwrite zone. Therefore, as soon as dataset A finishes this output is taken low 138 (overwrites can now occur) and is not taken high again 140 until the overwrite zone output 114 is taken low 136.

The outputs 110, 112, 114, 116 from the zone detector 80 are passed to the CCQ set multiplexer 82 together with the information passed to the zone detector 80 from the store request block 84, by the zone detector invoking the "received CCP set ( . . . )" operation 150. The parameters of the operation comprise those fed to the zone detector 80 from the store request block 84 by the "received CCP set" operation 148 plus the four outputs 110, 112, 114, 116 from the zone detector.

The CCQ set multiplexer 82 reads the status of the two read dataset state machines 76, 78 and obtains their state (by invoking operation "read state ( )" 152, 154) and the dataset number (by invoking operation "read num ( )" 156, 158) that they are currently processing. In the snapshot of FIG. 16 the CCQ set multiplexer 82 determines that read dataset one state machine 78 should receive the new CCP set because its dataset number is the same as that being worked upon, and therefore sends the "received CCP set ( . . . )" operation 144 to the read dataset 1 state machine 78. The dataset number is obtained from the header information by processing block 106, and is passed as a parameter of the "received CCP set" operation. The parameters of the operation are the same as those sent to the CCQ set multiplexer 82 by the zone detector 80. This information allows the read dataset 1 state machine 78 to correctly process the received CCP set. At other time instances the CCQ set multiplexer 82 may determine that the read dataset state machine 76 should correctly receive the CCP set, or indeed that both of the state machines 76, 78 should receive the CCP set.

Once the received CCP set operation 148, 150, 144 completes (i.e. is passed to one of the read dataset state machines 76, 78) the store request block 84 invokes the "read" operation 160, 162 to each of the state read dataset state machines 76, 78. The "read" operation 160,162 passes no information to the read dataset state machines 76, 78 but receives the dataset number and related indices on which the state machine was working. As discussed above, the indices identify the location in the main buffer 20 where the data held by the processing block 106 should be stored.

Once the "read" operation has completed the store request block 84 invokes the "read status" operation 164, passing the address for which it requires the status as a parameter, and receives the status as a reply, Next, the store request block 84 invokes the "write status" operation 166 to store the status that is has just received by invoking the "read status" operation 164. The "write status" operation 166 passes that address to which the write should be made and also the status received by the invoking the "read status" operation 164.

The store request block 84 then returns the parameters to the processing block 106 (store, indices, CCP index), completing the store request operation 107. Store indicates whether the data should be stored, or disregarded. The indices give an address within the main buffer 20 where the data should be written.

Thus, the store request block 84 has performed the following: Invoked the read ( ) operation 160, 162 on both read dataset state machines 76, 78 to determine the dataset numbers and indices.

The store request block implements the following algorithm to determine the outcome of the store request operation called by the processing block 106:

if (received dataset num=dataset num 0
   and state0 in neither idle nor no dataset num nor dataset complete
   execute store request for read dataset 0 CCP status and indices
elseif (received dataset num=dataset num
   and state 1 is neither idle nor no dataset num nor dataset complete
   execute store request for read dataset 1 CCP status and indices
else
   return store request with parameter store unset.

(From the foregoing it will be appreciated that when data is written it is verified to ensure that it has been written correctly, and re-written if there is a problem. Therefore, there is a latency between the data being written and verified so that once writing of the data has finished there will be a period before the data is verified, and possible rewrites of data have been made. In this period dummy data is written to the tape, but a flag (the amble flag) is set for this dummy data.

When the data is read, if the amble flag is set, it is known that the data is dummy data, and it is discarded.)

Further, when the store request block 84 processes the store request instruction 107 it will permit or reject the request according to the following;

IF amble flag is set
  THEN
    RETURN store request with store parameter user;
  ELSE
    INVOKE read status on CCP error status;
    INVOKE read status on CCP received status;
    IF CCP received status="not received"
    OR
    new status has fewer errors
    OR
    new status has same number of errors AND) config overwrite error with error is set
    OR
    new and old status' have no errors AND config overwrite with good is set.
    THEN
      RETURN store request with store parameter set:
      INVOKE write status on CCP error status.
      INVOKE, write status on CCP received status.
    ELSE
      RETURN store request with store parameter unset.

Turning to FIGS. 14 and 18 the operation of the two read dataset state machines will now be described. FIG. 18 follows a set format:

The cells of the diagram represent the states that the machine can occupy. The arrows between the cells represent the transitions. The text adjacent the arrows specifies the event that caused the transition, and also the events that occur during the transition. (The event causing the transition is specified first—before the "/" and the action made during the transition is specified after the "/").

The state machines 76, 78 remain in an idle state 168 until the deformat(indices) operation 145 is invoked by the read controller 206, which allows the state machine to proceed to the "no dataset number" state 170. The state machine remains in the "no dataset number" state 170 until it receives a dataset to decode, i.e. receives a "received CCP set" operation 144 from the CCQ set multiplexer 82. Once a dataset has been received the state machine acquires a dataset number and changes state to the "overlap zone" state 172 after invoking the "new dataset start/set dataset number" operation and the "init dataset" operation. The state machine did not previously have a dataset number because it was idle 168, and therefore, the dataset number is set to that sent by the "received CCP set" operation 144. The "unit dataset" operation initialises the status memory 21 ready to receive the dataset from the tape 10, Once the status memory 21 has been initialised by the "unit dataset" operation the "overlap zone" state 172 is entered (re-writes of the previous dataset can be expected at the beginning of any new dataset). Whilst the state machine remains in the "overlap zone" state 172, CQ sets read by the read heads 88-102 that are in the same dataset are stored appropriately in the memory of the tape drive according to the indices that have been passed to the read chain controller 74 by the read controller 206. The state machine remains in the "overlap zone" state whilst the exclusive zone output 112 from the zone detector 80 remains at zero or until any of the following occur:

The dataset being read by the read heads 88–102 changes, i.e. a re-write from a previous dataset has occurred 174 then the memory is reset ready to receive the new dataset by invoking the "init overlap" operation 176. The state machine remains 178 in the "overlap zone" state 172 ready to receive the new dataset.

A user configurable flag exists within the tape drive termed the "override in overlap" flag, which determines how the state machine behaves if a third dataset number is detected in an overlap zone. This should not occur, but can do so. If the flag is set then the state machine reinitialises itself to receive the third dataset and moves via path 192 to the idle state 168, ready to receive the dataset with the third number. If the flag is unset, then the third dataset number is ignored, and the state machine remains in the overlap zone state 172 (moving via path 178 back to the overlap zone state 172).

In addition to receiving a third dataset number, the state machine can also move out of the "overlap zone" state 172 if a dataset finished condition is met. Once the dataset finished condition is met the state machine moves, via path 192, to the idle state 168 after invoking the operation "op deformat done" 190. From "overlap zone" state 172 the dataset finished condition is met if a "deformat flush" operation is invoked by the read controller 206.

If the exclusive zone output 112 of the zone detector goes to logic one and the overwrite zone output 114 of the zone detector goes to logic one then it is indicated that the data being read from the tape is now in an overwrite zone. Once the data being read from the tape enters the overwrite zone and the zone detector outputs alter accordingly the state machine moves the "overwrite zone" 184, via the path 186.

The state machine can also move to the "overwrite zone" state 184 if an overwrite is detected whilst in the "overlap zone" state 172. This occurs if it the dataset number remains the same, but the write pass number changes. If there is such an occurrence then the state machine moves from the "overlap zone" 172 to the "overwrite zone" 174 via the path 185, which includes the step on initialising the memory by invoking the "init dataset" operation, so as to be ready to receive new data in the "overwrite zone" state 184.

Flow of the state machine can leave the "overwrite zone" state 184 by three occurrences. Firstly, if the overwrite zone output 114 of the zone detector 80 becomes set to logic zero (and the post overwrite zone output 116 becomes set to logic one), in which case the state machine moves to the "beyond overwrite zone" state 188, via path 198. Secondly, if an overwrite is detected, then the memory is reset by invoking the "init dataset" operation 196 before flow returns to the "overwrite zone" state 184 via path 194. Thirdly, the finish of the dataset can be detected by the change of dataset number, whilst in an exclusive zone, which causes the state machine to move, via path 195 to the "idle" state 168 and invoke the "op deformat done" operation. The state machine can also return to the "idle" state 168 from the "overwrite zone" state 184 if an operation to flush processing of the current dataset is received, If the state machine has moved from the "overwrite zone" state 184 to the "beyond overwrite zone state" 188 the state machine can leave this state on two occurrences.

Firstly, an overwrite may occur. Such an overwrite should not occur since the data being read from the tape 10 is beyond the overwrite zone, but the situation needs to be accounted for. If such an overwrite does occur (i.e. overwrite restart 200) then the state machine remains in the "beyond overwrite zone" state 188, looping via path 202, but the read controller 206 is informed that such an overwrite has occurred. Secondly, the finish of the dataset can be detected by a change of dataset number whilst the exclusive zone output 112 is set to logic one. Such a change of dataset number causes the state machine to move, via path 204 to the "idle" state 168 and invoke the "op deformat done" operation. The state machine can also return to the "idle" state 168 from the "beyond overwrite zone" state 188 if an operation to flush processing of the current dataset is received.

As can be seen from FIG. 16 when the op "deformat done" operation is invoked by the state machine, the operation request is passed along with the indices, and various dataset status and positional information to the read controller 206.

FIG. 14 shows the possible states for the two state machines 76, 78 as each decode different datasets. The middle trace is for state machine 76 (read dataset 0) and the bottom trace is for state machine 78 (read dataset 1). The regions of FIG. 14 that appear shaded indicate the states in which that state machine in receiving a CQ set.

The top trace of FIG. 14 shows that for the duration of the Figure three datasets "x", "y", "z", are received by the two state machines dataset 0 76, and dataset 1 78.

Taking left to right as the time axis for the Figure, with t=0 at the left hand side, at the beginning of the graph both of the state machines are in the idle state. At time A the state machine read dataset 0 enters the "no dataset num" state, whereas because of delays within the controller 206 state machine read dataset 1 78, does not enter this state until time B. State machine read dataset 0 76 proceeds to receive CQ sets from dataset x and decode them. As the CQ sets are decoded the read chain controller 74 passes the results of the "store request" operation 107 back to the processing block 106 so that the data can be stored appropriately. (The state machine read dataset 0 76 t enters the "overlap zone" state 172 at time C, enters the "overwrite zone" state 184 at time D, and enters the "beyond overwrite zone" state 188 at time E, before finishing decoding the dataset at time G and returning to the "idle" state 168 then.)

For the majority of the time that the read dataset 0 state machine 76 is decoding dataset x the read dataset 1 state machine 78 remains in the "no dataset num" state 170, since the data being read from the tape 10 will be from the dataset that the read dataset 0 state machine is decoding. Until the seven CQ set read while write latency has expired, i.e. the read dataset 1 78 state machine has confirmed that it is in an exclusive zone, the read dataset 0 state machine 0 76 cannot move to the idle state. Therefore, as can be seen in FIG. 14 state machine-read dataset 1 enters the "overlap zone" state 172 at time F, before state machine read dataset 0 finishes decoding its dataset. The state machine read dataset 0 76 does not confirm that it has finished its dataset until time G when state machine read dataset 1 78 enters the overwrite zone state 184.

The state machine read dataset 1 78 moves through the states of the state machine diagram: entering the "overwrite zone" state 184 at time G, entering the "beyond overwrite zone" state 188 at time I, and finishes decoding the dataset y and therefore entering the "idle" state 168 at time K.

Whilst the state machine read dataset 1 78 is decoding the dataset, the state machine read dataset 0 76 remains in the "no dataset num" state 170, but as discussed previously, state machine dataset 0 76 enters the "overlap zone" state 172, at time J, as state machine dataset 1 78 nears the end of decoding its dataset. The read dataset 1 state machine 78 will not move to the idle state until time K when the read dataset 0 state machine 76 enters the exclusive zone.

The key points in the operation of the read chain controller 74 for it to be able to decode datasets on the tape 10 are as follows, The main problems this block is solving are:

1. Spotting the completion of the dataset. This is done when the exclusive zone is confirmed for a different dataset. i.e. as shown in FIG. 15 when one of the state machines moves to the "overlap zone" state 172 the other state machine moves to the "idle" state 168.
2. Spotting the restart of a dataset due to an overwrite. This occurs when the write pass number changes, but the dataset number is the same.
3. Spotting the restart of a dataset due to a rewrite from the previous dataset, i.e. in the overlap zone. If this occurs, use of previous CCQ sets for the restarted dataset is configurable.
4. Coping with unexpected dataset numbers. These are ignored or used according to the configuration Override in Over-lap flag discussed above in relation to FIG. 18.

All of the above actions are carried out by reading the information contained in the header information for the CQ sets, and does not directly rely on any of the other information contained on the tape 10.

Another embodiment of the invention may comprise a data reader arranged to read a data-bolding medium containing first and second markers in addition to user data, said data reader comprising at least one read head arranged to read the data-holding medium and generate a data signal corresponding to said first and second markers, and said user data, said data reader further comprising processing circuitry arranged to receive said data signal and obtain said user data from said data-holding medium wherein, said processing circuitry is arranged to identify said user data without reference to said first marker. In such an embodiment the first marker comprises a data set separator (DSS) field, and said second marker comprises a vfo and sync field.

Indeed, the data-reader may be arranged to read data-holding mediums containing three markers, and arranged to do so without reference to said first marker. In such an embodiment said first marker comprises said DSS field, and one of said second and third markers comprises one of said vfo, and sync. fields, and the other of said second and third markers comprises the other of said vfo, and sync. fields.

What we claim is:

1. A data reader arranged to read a data-holding medium containing data comprising both user and non-user data, said data being held in at least one set, and datasets arranged from the at least one set, said non-user data holding information relating to said user data and being interspersed therewith, said data reader comprising at least one read head arranged to read said data-holding medium and generate a data signal comprising user data and non-user data, said non-user data being arranged to identify said user data within said sets, processing circuitry being arranged to (a) receive and process said data signal, (b) obtain said user data from said data signal using said non-user data to identify said user data within said data signal, and (c) occupy a state reflecting whether said data being read from the data-holding medium is in an overlap zone in which sets of data can originate from a plurality of datasets.

2. A data reader according to claim 1 wherein said processing circuitry comprises a timer arranged to time from the end of the last set of user data within a dataset, and said processing circuitry is arranged to enter said state reflecting that data being read from said data-holding medium is in an overlap zone until said timer reaches a predetermined value.

3. A data-reader according to claim 2 wherein said processing circuitry is arranged to monitor said data signal and reset said timer should said data signal comprise a re-write of substantially the same set of user data from a dataset before said timer reaches said predetermined value.

4. A data reader according to claim 1 wherein said processing circuitry is arranged to monitor said data signal and further arranged to determine whether a set of user data has been written to said data-holding medium a plurality of times by monitoring said non-user data within said data signal.

5. A data reader according to claim 4 wherein said processing circuitry is arranged to reject an earlier received set of user data in favor of a later substantially identical set of user data if said processing circuitry determines that said set of user data has been written to said data-holding medium a plurality of times.

6. A data reader according to claim 1 wherein said processing circuitry is arranged to monitor said non-user data so determine whether neighboring sets of user data being read from a said data holding medium were written in the same write pass.

7. A data reader according to claim 1 wherein said processing circuitry is arranged to monitor said non-user data and identify the identity of said sets of data being read from a said data-holding medium, and further arranged to determine if more than two datasets have occurred within an overlap zone.

8. A data reader according to claim 7 wherein said processing circuitry is arranged to reject sets of data that occur from greater than a second dataset within said overlap zone.

9. A data reader according to claim 7 wherein said processing circuitry is arranged to reject earlier received sets of data once sets of user data are received from said data-holding medium from greater than a second dataset within said overlap zone.

10. A data reader arranged to read a data-holding medium containing data comprising both user end non-user data, said data being held in at least one set, and datasets arranged from the at least one set, said non-user data holding information relating to said user data and being interspersed therewith, said data reader comprising at least one read head arranged to read said data-holding medium and generate a data signal comprising uses data and non-user data, said non-user data being arranged to identify said user data within said sets, processing circuitry being arranged to receive and process said data signal and obtain said user data from said data signal using said non-user data to identify said user data within said data signal, said processing circuitry comprises a timer arranged to time from the end of the last set of user data within a dataset and is arranged to occupy a state reflecting that said user data being read from said data-holding medium is in an exclusive zone, indicating that said user data should only occur from a single dataset, once said timer has reached a predetermined value.

11. A data reader arranged to read a data-holding medium containing data comprising both user and non-user data, said data being held in at least one set, and datasets arranged from the at least one set, said non-user data holding information relating to said user data and being interspersed therewith, said data reader comprising at least one read head arranged to read said data-holding medium and generate a data signal comprising uses data and non-user data, said non-user data being arranged to identify said user data within said sets, processing circuitry being arranged to receive and process said data signal and obtain said user data from said data signal using said non-user data to identify said user data within said data signal, said processing circuitry is arranged to occupy a state reflecting that data being read from said data-holding medium is in an overwrite zone in which a first dataset being read therefrom can be overwritten by a second dataset, before the end of said first dataset is reached.

12. A data reader according to claim 11 in which said processing circuitry is arranged to occupy a state reflecting that data being read from said data-holding medium is beyond said overwrite zone.

13. A data reader arranged to read a data-holding medium containing data comprising both user and non-user data, said data being held in at least one set, and datasets arranged from the at least one set, said non-user data holding information relating to said user data and being interspersed therewith, said data reader comprising at least one read head arranged to read said data-holding medium and generate a data signal comprising uses data and non-user data, said non-user data being arranged to identify said user data within said sets, processing circuitry being arranged to receive and process said data signal and obtain said user data from said data signal using said non-user data to identify said user data within said data signal, a zone detector to interpret said non-user data and determine whether said user data is from the same dataset.

14. A data reader arranged to read a data-holding medium containing data comprising both user and non-user data said data being held in at least one set, and datasets arranged from the at least one set, said non-user data holding information relating to said user data and being interspersed therewith, said data reader comprising at least one read head arranged to read said data-holding medium and generate a data signal comprising uses data and non-user data, said non-user data being arranged to identify said user data within said sets, processing circuitry being arranged to receive and process said data signal and obtain said user data from said data signal using said non-user data to identify said user data within said data signal, said processing circuitry is arranged to occupy a state reflecting the status of sets of data being read from a said data-holding medium, said processing circuitry comprising a zone detector to interpret said non-user data and determine whether said user data is from the same dataset, and in which said zone detector is arranged so that it controls the state occupied by said processing circuitry.

15. A data storage device incorporating a data reader according to claim 1.

16. A method of reading data from a data-holding medium containing user data held in a plurality of sets and interspersed with non-user data, said non-user data holding information relating to said user data, the method comprising reading said non-user data to identify said user data within said sets and obtain said user data from said data-holding medium, said method further comprising arranging said sets of user data into datasets, the identity of which are provided by the non-user data, monitoring the non-user data to ascertain the identity of the dataset being read from the data-holding medium, and using the non-user data to determine whether data being read from the data-holding medium is in an overlap zone in which sets of data can originate from a plurality of datasets.

17. A method according to claim 16 which comprises using the non-user data to determine if any of the sets of data from a dataset have been written a plurality of times to the data-holding medium during writing of the data to the data-holding medium.

18. A method according to claim 17 comprising rejecting an earlier set of data from a dataset read from the data-holding medium, in favor of a later received substantially identical set of data from a dataset once it is detected that a set of data has been written a plurality of times to the data-holding medium.

19. A method according to claim 16 comprising using a state machine to monitor whether the data being read from the data-holding medium is in an overlap zone.

20. A method according to claim 16 comprising determining whether sets of data being read from the data-holding medium were written in the same pass by monitoring the non-user data.

21. A method according to claim 20 comprising monitoring a portion of the non-user data that provides a numerical value representing the pass on which the set of data being read was written, further comprising detecting whether the numerical value is altered for neighboring sets of data.

22. A method according to claim 16 comprising monitoring the identity of the datasets being read from the data-holding medium and determining if more than two datasets have occurred within the overlap zone.

23. A method according to claim 22 comprising rejecting sets of data read from the data-holding medium that occur from a third or higher dataset that occurs within the overlap zone.

24. A method according to claim 22 comprising rejecting sets of data from earlier datasets read from the data-holding medium within the overlap zone if more than two datasets occur within the overlap zone.

25. A computer readable medium having stored therein instructions for causing a processing unit to execute the method of claim 16.

26. A method of reading data from a data-holding medium containing user data held in a plurality of sets and interspersed with non-user data, said non-user data-holding information relating to said user data, the method comprising reading said non-user data to identify said user data within said sets and obtain said user from said data-holding medium said method further comprising arranging said sets of user data into datasets, the identity of which are provided by the non-user data, and monitoring the non-user data to ascertain the identity of the dataset being read from the data-holding medium and using the non-user data to determine when the end of a dataset has occurred further comprising timing from the end of the last set of user data in a dataset to ensure that no re-writes of the last or any other set of user data from that dataset are present on the data-holding medium.

27. A method according to claim 26 which comprises using the non-user data to determine if any of the sets of data from a dataset have been re-written and restarting the timing if any re-writes are detected once the last set of user data within a dataset has been read.

28. A method according to claim 27 comprising asserting that data being read from the data-holding medium is in an exclusive zone, such that data should only occur from a single dataset, once the timing has reached a predetermined value.

29. A method of reading data from a data-holding medium containing user data held in a plurality of sets and interspersed with non-user data, said non-user data-holding information relating to said user data, the method comprising reading said non-user data to identify said user data within said sets and obtain said user from said data-holding medium said method further comprising arranging said sets of user data into datasets, the identify of which are provided by the non-user data, and monitoring the non-user data to ascertain the identity of the dataset being read from the data-holding medium, and detecting whether data being read from the data-holding medium is in an overwrite zone in which a first dataset being read therefrom can be overwritten by a second dataset, before the end of said first dataset is reached.

30. A method according to claim 29 comprising monitoring whether the data being read from the data-holding medium is in an overwrite zone by using a state machine.

* * * * *